United States Patent
Garg et al.

(10) Patent No.: US 11,200,595 B2
(45) Date of Patent: Dec. 14, 2021

(54) METHOD AND SYSTEM FOR SPAM PREVENTION IN BLOCKCHAIN ADVERTISING

(71) Applicant: MASTERCARD INTERNATIONAL INCORPORATED, Purchase, NY (US)

(72) Inventors: Chandan Garg, Punjab (IN); Meenakshi Shandilya, Madhya Pradash (IN); Jaipal Singh Kumawat, Rajasthan (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 115 days.

(21) Appl. No.: 16/236,707

(22) Filed: Dec. 31, 2018

(65) Prior Publication Data

US 2020/0211054 A1 Jul. 2, 2020

(51) Int. Cl.
*G06Q 30/02* (2012.01)
*G06Q 20/40* (2012.01)

(52) U.S. Cl.
CPC ....... *G06Q 30/0248* (2013.01); *G06Q 20/401* (2013.01); *G06Q 2220/00* (2013.01)

(58) Field of Classification Search
None
See application file for complete search history.

(56) References Cited

U.S. PATENT DOCUMENTS 10,305,833 B1 * 5/2019 Dennis .................. H04L 51/12
2018/0276626 A1 * 9/2018 Laiben .................. G06Q 20/02

FOREIGN PATENT DOCUMENTS

JP           2019036032 A   *  3/2019

OTHER PUBLICATIONS

Elo et al., Risks from Spam Attacks on Blockchains for Internet-of-Things Devices, 2018 IEEE 9th Annual Information Technology, Electronics and Mobile Communication Conference (IEMCON), Nov. 2018, p. 314-320 (Year: 2018).*

* cited by examiner

*Primary Examiner* — Isidora I Immanuel
(74) *Attorney, Agent, or Firm* — Buchanan Ingersoll & Rooney PC (57) ABSTRACT

A method for adjusting a spam index for a blockchain advertiser based on user consensus includes: storing an advertiser profile related to an advertising entity including at least an index value and an identification value; receiving new blocks in a blockchain, each including a block header and blockchain data values, where a plurality of the data values each includes an advertiser identifier, advertisement value, and a recipient identifier; receiving a plurality of spam reports, each associated with one of the data values and including at least one of: the advertisement value included in the respective data value or a reference value generated by hashing the respective data value; determining a ratio of a number of spam reports to number of the data values that includes the advertisement value; and adjusting the index value included in the advertiser profile according to the ratio.

12 Claims, 6 Drawing Sheets

METHOD AND SYSTEM FOR SPAM PREVENTION IN BLOCKCHAIN ADVERTISING

FIELD

The present disclosure relates to spam prevention in blockchain advertising, specifically the accommodating of advertisements served to users via a blockchain and the use of a spam index to monitor and prevent spam advertisements.

BACKGROUND

Advertising has a long history across the world. While advertising is primarily used to benefit merchants, manufacturers, retailers, and other entities seeking to make a profit in some manner, advertisements can often benefit the viewers of the advertisements themselves. For instance, many individuals may be unaware of a product's existence, but, once exposed to an advertisement for the product or service, may be grateful. In an effort to strengthen the benefits provided to both sides of an advertisement, targeting is often utilized. Targeting is the practice of identifying the ideal demographic audience for an advertisement and delivering the advertisement to that ideal demographic audience. For instance, advertising a new electronic gadget to tech-oriented individuals with disposable income, or advertising a new toy to a child during children's' television programming.

However, it can be difficult for advertisers to reach their target audience once one is identified. For instance, in many cases advertisements are exposed to a large audience (e.g., in a newspaper or magazine, on a billboard or public transit, etc.), where the overall audience may include the target audience, but may also include a large number of other individuals, lowering the efficiency of the advertisement. As such, advertisers have been seeking methods for advertising directly to individual users. The most common type of such an advertisement is through e-mail or web sites, where advertisements can be selected on a per-individual basis. However, as such a method has been used for years, some users have grown desensitized to such advertising, making it easy for the user to ignore the advertisement and utilize tools that block such advertisements entirely. Thus, there is a need for a new type of delivery system for advertisements that can be targeted directly to an individual and utilizing a new medium.

SUMMARY

The present disclosure provides a description of systems and methods for adjusting a spam index for a blockchain advertiser based on user consensus that affects mining fees charged to the blockchain advertiser. Advertisers are provided with public keys for user blockchain wallets, enabling advertisements to be delivered to consumers on a per-individual basis. At the same time, users are provided with the ability to submit reports for spam advertisements when advertising is unwanted by the user. The system identifies every instance of the advertisement being delivered on the blockchain through identifying the hash of the advertisement in blockchain data values, and compares the number of spam reports with the number of deliveries of the advertisement. The ratio is used to adjust a spam index for the advertiser, where the spam index results in increases or decreases to mining fees paid by the advertiser for having its advertisements distributed on the blockchain. As a result, the more spam that an advertiser puts out, the more expensive it gets for the advertiser to deliver each advertisement. Thus, advertisers are rewarded for delivering good advertisements, to the benefits of the consumers and advertisers alike, through the use of a blockchain for advertisement delivery and indexing.

A method for adjusting a spam index for a blockchain advertiser based on user consensus that affects mining fees charged to the blockchain advertiser includes: storing, in a memory of a processing server, an advertiser profile related to an advertising entity including at least an index value and an identification value; receiving, by a receiver of the processing server, one or more new blocks in a blockchain, each new block including a block header and one or more blockchain data values, where a plurality of the one or more blockchain data values each includes an advertiser identifier, advertisement value, and one of a plurality of recipient identifiers; receiver, by the receiver of the processing server, a plurality of spam reports, each spam report being associated with one of the plurality of the one or more blockchain data values and including at least one of: the advertisement value included in the respective blockchain data value or a reference value generated by hashing the respective blockchain data value; determining, by a processing device of the processing server, a ratio of a number of spam reports included in the plurality of spam reports and a number of the plurality of one or more blockchain data values that includes the advertisement value; and adjusting, by the processing device of the processing server, the index value included in the advertiser profile according to the determined ratio.

A system for adjusting a spam index for a blockchain advertiser based on user consensus that affects mining fees charged to the blockchain advertiser includes: a memory of a processing server configured to store an advertiser profile related to an advertising entity including at least an index value and an identification value; a receiver of the processing server configured to receive one or more new blocks in a blockchain, each new block including a block header and one or more blockchain data values, where a plurality of the one or more blockchain data values each includes an advertiser identifier, advertisement value, and one of a plurality of recipient identifiers, and receive a plurality of spam reports, each spam report being associated with one of the plurality of the one or more blockchain data values and including at least one of: the advertisement value included in the respective blockchain data value or a reference value generated by hashing the respective blockchain data value; and a processing device of the processing server configured to determine a ratio of a number of spam reports included in the plurality of spam reports and a number of the plurality of one or more blockchain data values that includes the advertisement value, and adjust the index value included in the advertiser profile according to the determined ratio.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Discouraging Spam in Blockchain Advertisements Through Indexing

Figure 1:
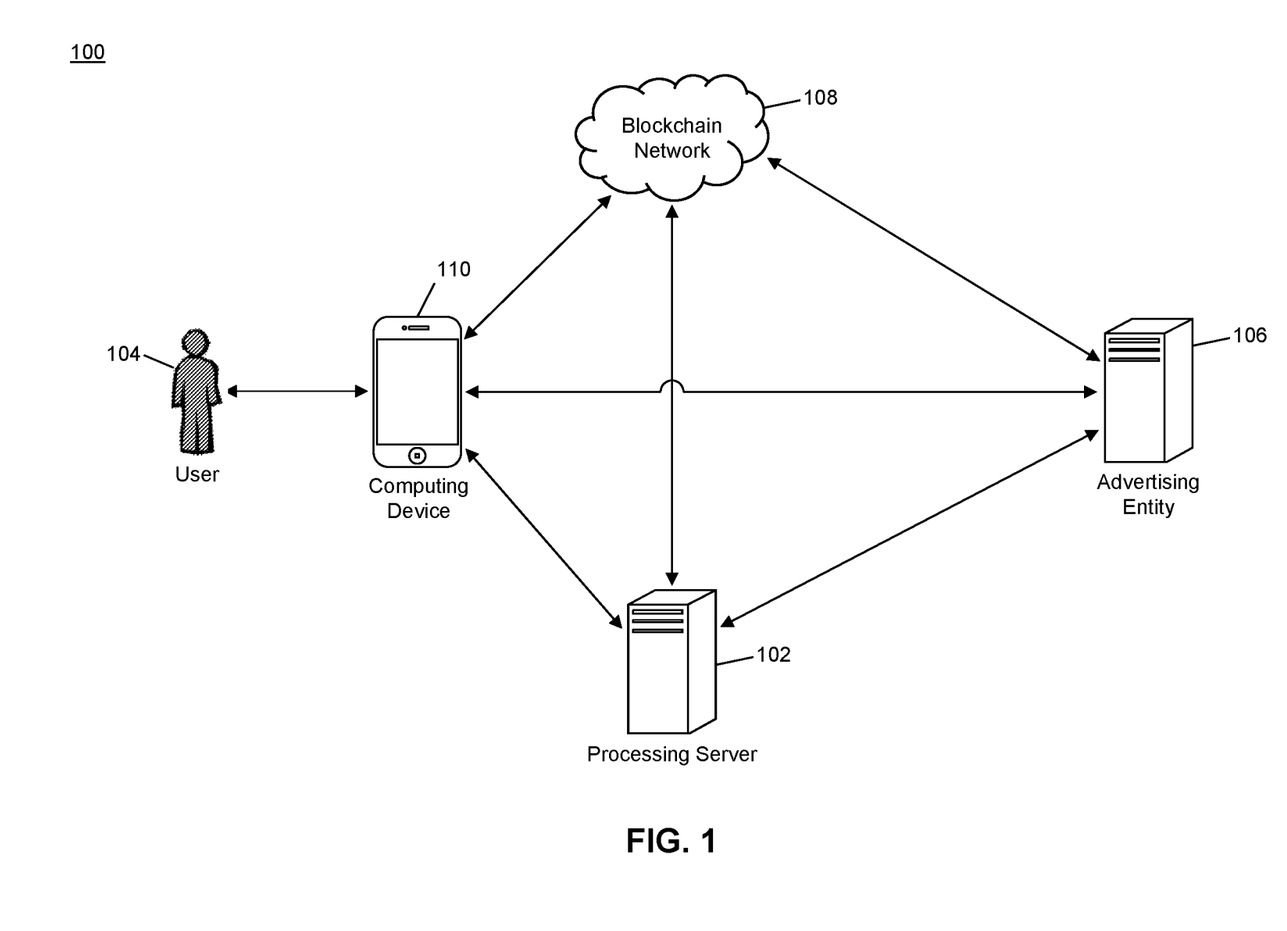
FIG. 1 is a block diagram illustrating a high level system architecture for indexing blockchain advertisers based on spam reports in accordance with exemplary embodiments.

FIG. 1 illustrates a system 100 for the use of index values associated with advertisers based on advertisements delivered through a blockchain and subsequently received spam reports from individual recipients of the advertisements.

The system 100 may include a processing server 102. The processing server 102, discussed in more detail below, may be configured to provide a platform for the serving of advertisements to users 104 of a blockchain through the blockchain itself, and to maintain a spam index for each of the advertising entities 106 such that mining fees paid by advertising entities 106 for serving advertisements on the blockchain is affected by the spam index.

In the system 100, each user 104 may possess or otherwise be associated with a blockchain wallet for use in interacting with the blockchain. The blockchain wallet may be associated with a blockchain network 108 that is used to transmit and receive blockchain currency in electronic payment transactions conducted via the blockchain network 108. A blockchain wallet may be an application program that is executed by a computing device 110 possessed by the user 104. A blockchain wallet may include a private key of a cryptographic key pair that is used to generate digital signatures that serve as authorization by the user 104 for a blockchain transaction, where the digital signature can be verified by the blockchain network 108 using the public key of the cryptographic key pair. In some cases, the term "blockchain wallet" may refer specifically to the private key. In some embodiments, a repository or other third party service may store the user's private key. In other embodiments, the private key may be stored on the computing device 110. The computing device 110 may be any type of device suitable for performing the functions discussed herein, such as a desktop computer, laptop computer, tablet computer, notebook computer, cellular phone, smart phone, smart watch, smart television, wearable computing device, implantable computing device, etc.

The blockchain network 108 may be comprised of a plurality of nodes. Each node may be a computing system that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. In exemplary embodiments, the processing server 102 may be a node in the blockchain network 108. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 108 prior to the generation and addition of a new block to the blockchain in order for the change to be made permanent. Computational and communication limitations may make such a modification exceedingly difficult, if not impossible, thus rendering the blockchain immutable.

The confirmation and validations of blockchain data values and new blocks may be performed by nodes in the blockchain network 108. In some cases, third party computing systems may assist in the validation and confirmation of blockchain data values and new blocks, where such systems are referred to as "miners" and the confirming of new transactions and/or blocks referred to as "mining." In some blockchains, each block header may include a unique value, such as a nonce, where the block reference value for the block conforms to one or more predetermined rules. For instance, in one example, a suitable nonce must be found to where the block reference value for that block has a predetermined number of leading zeroes. In these cases, miners may compete to identify the correct nonce for a block before any other miner, where the winning miner is provided with an award, referred to as a "mining fee," paid as discussed below.

A blockchain data value may correspond to a blockchain transaction. A blockchain transaction may consist of at least: a digital signature of the sender of currency (e.g., the advertising entity 106) that is generated using the sender's private key, a blockchain address of the recipient of currency (e.g., the user 104) generated using the recipient's public key, and a blockchain currency amount that is transferred. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. In some cases, a blockchain transaction may also include the sender's public key, for use by any entity (e.g., a node or miner) in validating the transaction. In cases where a mining fee is awarded to the miner that mines a blockchain transaction, an additional output address (e.g., generated using the miner's public key) and currency amount, for payment of the mining fee to the miner. In such cases, the sender (e.g., the advertising entity 106) thus pays a fee to the miner. As discussed below, the spam index for the advertising entity 106 may be used to determine the mining fee. For the processing of a blockchain transaction, such data may be provided to a node in the blockchain network 108, either by the sender or the recipient (e.g., by the computing device 110). The node may verify the digital signature and the sender's access to the funds, and then include the blockchain transaction in a new block. The new block may be validated by other nodes in the blockchain network 108 before being added to the blockchain and distributed to all of the nodes in the blockchain network 108.

In a standard blockchain transaction, the advertising entity 106 may thus generate a digital signature using the private key thereof. The user 104 may (e.g., via the computing device 110) generate a blockchain address using its public key, which may be provided to the advertising entity 106. In some cases, the computing device 110 may provide the advertising entity 106 with its public key, where the advertising entity 106 may generate the blockchain address. The advertising entity 106 may then submit the required information to a node in the blockchain network 108 for processing. In some instances, the node may return a blockchain transaction identifier to the advertising entity 106, which may be a value that is unique to that blockchain transaction for identification thereof. In such traditional transactions, the computing device 110 is required to generate blockchain address or distribute its public key, and, in some cases, may be required to submit the transaction data directly to blockchain networks 108.

In the system 100, the blockchain may be used to serve advertisements to users 104 from advertising entities 106. In such cases, a blockchain transaction between the advertising entity 106 and user 104 may be used to deliver the advertisement. In some instances, the currency value for the blockchain transaction (e.g., associated with the user's recipient address) may be the advertisement itself (e.g., a data file or other information pertaining to the advertisement). In other instances, the currency value may be zero (e.g., for the user 104, where the mining fee may still be paid) and the advertisement may be included in a separate data field in the blockchain data value or in a separate blockchain entry that may not be related to the transfer of currency. In the systems and methods discussed herein, advertisements may thus be delivered to users 104 on a per-user basis, as each user may have an advertisement sent directly to them via their blockchain wallet. In some embodiments, the computing device 110 may detect when the blockchain wallet thereof is the recipient of a transaction and may provide a notification to the user 104 upon such a detection. In cases where an advertisement is delivered, the notification may consist of showing the advertisement to the user 104.

In an exemplary embodiment, the processing server 102 may maintain a spam index value for each of the advertising entities 106. If a user 104 believes that an advertisement served thereto was spam, then the user 104 may be able (e.g., via the computing device 110) submit a spam report to the processing server 102 using any suitable method, such as via a web page, application programming interface, short messaging service message, e-mail, etc. The spam report may indicate the advertisement itself or the blockchain transaction that was used to serve the advertisement. The advertisement itself may be referred to by the data file, a hash of the data file or other value included in the blockchain transaction, or other suitable identifier. The blockchain transaction may be identified using the transaction identifier, or a hash of the blockchain data value itself.

For each advertisement that is served on the blockchain, the processing server 102 may identify a number of copies of that advertisement that was served. The copies may be identified by checking each of the blockchain transactions (e.g., or other messages, as applicable) in the blockchain that include the value for that advertisement, or other associated identifier for the advertisement. As the processing server 102 receives spam reports for an advertisement, the processing server 102 can identify a ratio of the number of spam reports received for the advertisement compared to the total number of times that advertisement was served in the blockchain. This ratio may then be used to adjust a spam index for the advertising entity 106 that delivered the advertisement. In some embodiments, the processing server 102 may offer a platform for advertising entities 106 to dispute spam reports, where resolution of such a dispute may affect whether or not the spam report is used to adjust the spam index, such as to prevent fraudulent claims by users 104.

The spam index may represent the frequency at which the advertising entity distributes spam to users 104. In some cases, the index may be a percentage, such as a value from 1-100 indicating the average frequency of spam reports for their advertisements. In other cases, the index may be a value from 0 to 1 based on the average ratios of spam reports to the advertising entity's advertisements. Any other suitable value for representing the spam index may be used.

A spam index value for an advertising entity 106 may be used to determine mining fees paid by the advertising entity 106 when distributing an advertisement to a user 104. In such embodiments, a spam index value that indicates that the advertising entity 106 rarely distributes spam will result in a lower mining fee to be paid than a spam index value that indicates that the advertising entity 106 frequency distributes spam. As a result, it may become more and more expensive for an advertising entity 106 to distribute spam, thus discouraging the advertising entity 106 from such practices. The mining fee may be calculated using an algorithm and the spam index value, may be discrete and based on spam index value ranges, or may be identified from spam index values using any other suitable method.

In some embodiments, the spam index value for an advertising entity 106, and thereby the mining fee to be paid for advertisements, may be adjusted in real time. In such embodiments, any time a spam report is received, the processing server 102 may update the count of the number of times the advertisement was delivered, may determine the ratio of spam reports to advertisement deliveries, and may adjust the spam index for the advertising entity 106 based on the change to the ratio as a result of the spam report. In these embodiments, the mining fee to be paid by the advertising entity 106 for a new advertisement delivery may be based on this real time spam index value. In some cases, the spam index value may be recalculated prior to the distribution of an advertisement on the blockchain.

The methods and systems discussed herein provide for the delivery of advertisements on a per-user basis. The use of a blockchain provides for individualized delivery, while also maintaining a high level of accountability for advertising entities 106 due to the transparency and immutability offered by the blockchain. In addition, the requirement of mining fees for contributing to the blockchain, and modifying the mining fee based on an advertising entity's spam index value may result in greater participation of the advertising entity 106 with a minimal amount of spam, whereas an advertising entity 106 that continues to distribute spam will have costs constantly increasing. As such, the methods and systems discussed herein will result in less delivering of spam, and thereby provide for better, well-received advertisements.

Processing Server

Figure 2:
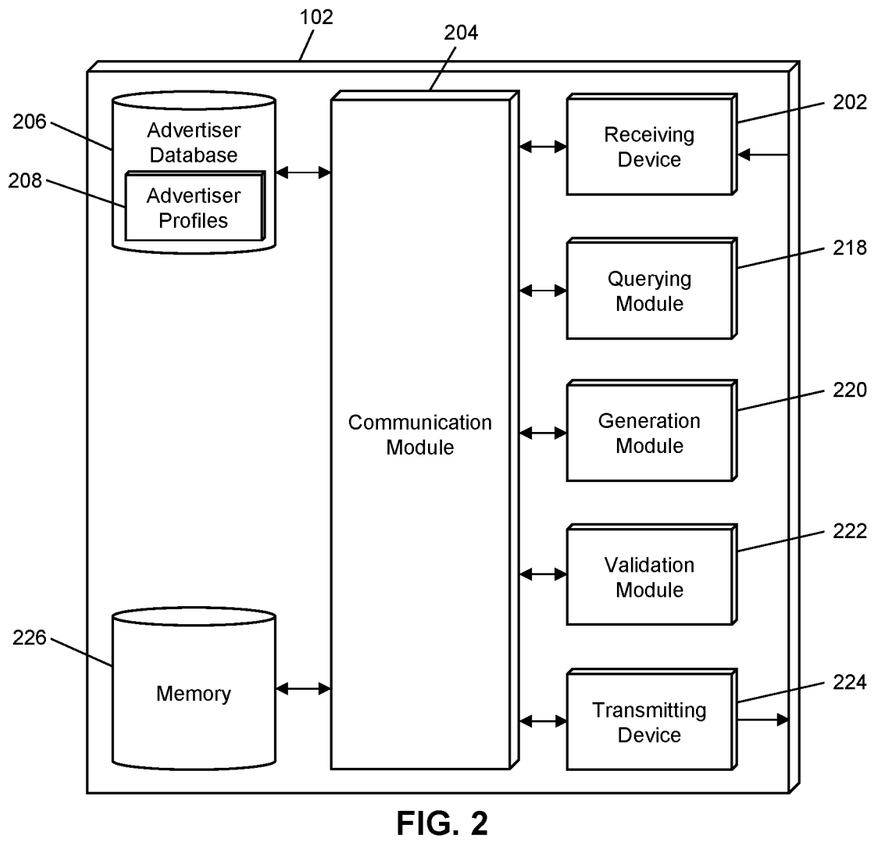
FIG. 2 is a block diagram illustrating the processing server of the system of FIG. 1 for the adjustment of a spam index for blockchain advertisers in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 600 illustrated in FIG. 6 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from advertising entities 106, blockchain networks 108, computing devices 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by advertising entities 106 that are superimposed or otherwise encoded with new blockchain data values or data for inclusion therein for posting to the blockchain, which may include recipient addresses, sender addresses, digital signatures, currency amounts, and advertisements. The receiving device 202 may be configured to receive data signals electronically transmitted by nodes in blockchain networks 108 that may be superimposed or otherwise encoded with blockchain data values and new blocks for validation and/or inclusion in the blockchain, or from miners that may include nonces or other data for use in confirming and adding blockchain data values to the blockchain. The receiving device 202 may also be configured to receive data signals electronically transmitted by computing devices 110, which may be superimposed or otherwise encoded with spam reports, which may include information identifying an advertisement, and any other data for reporting, such as a reason code for why the user 104 is reporting an advertisement for spam.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, validation module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include an advertiser database 206. The advertiser database 206 may be configured to store a plurality of advertiser profiles 208 using a suitable data storage format and schema. The advertiser database 206 may be a relational database that utilizes structured query language for the storage, identification, modifying, updating, accessing, etc. of structured data sets stored therein. Each advertiser profile 208 may be a structured data set configured to store data related to an advertising entity 106. An advertiser profile 208 may include at least a spam index value identified for the associated advertising entity 106. In some case, the advertiser profile 208 may include information identifying the advertising entity 106 and/or for communicating with the advertising entity 106, information (e.g., the spam ratio, advertisement hash, etc.) for each advertisement delivered by the associated advertising entity 106, the mining fee currently charged to the associated advertising entity 106 for their advertisements, etc.

The processing server 102 may include a querying module 218. The querying module 218 may be configured to execute queries on databases to identify information. The querying module 218 may receive one or more data values or query strings, and may execute a query string based thereon on an indicated database, such as the advertiser database 206, to identify information stored therein. The querying module 218 may then output the identified information to an appropriate engine or module of the processing server 102 as necessary. The querying module 218 may, for example, execute a query on the advertiser database 206 to update the spam index value for an advertising entity 106 based on a ratio of spam reports received for the number of advertisements delivered for an advertisement.

The processing server 102 may also include a generation module 220. The generation module 220 may be configured to generate data for use by the processing server 102 in performing the functions discussed herein. The generation module 220 may receive instructions as input, may generate data based on the instructions, and may output the generated data to one or more modules of the processing server 102. For example, the generation module 220 may be configured to generate notifications and other data messages for transmission to computing devices 110, advertising entities 106, blockchain nodes, etc., such as prompts for digital signatures, registration data, public key requests, spam index value updates, mining fee information, etc. The generation module 220 may also be configured to generate blockchain addresses using public keys using suitable algorithms and to verify digital signatures using algorithms used in the generation of digital signatures, using a public key of a cryptographic key pair that includes the private key used to generate the digital signature.

The processing server 102 may also include a validation module 222. The validation module 222 may be configured to validate data for the processing server 102 as part of the functions discussed herein. The validation module 222 may receive data to be validated as input, may attempt the validation, and may then output a result of the validation to another module or engine of the processing server 102. In some cases, the input may include all data to be used in the validation by the validation module 222. In some instances, the validation module 222 may be configured to identify the data necessary for use in making a validation, such as by issuing a request to the querying module 218 to identify data for use in the validation. In an example, the validation module 222 may be configured to validate spam reports, digital signatures, recipient and sender addresses, access to suitable amounts of currency, etc.

The processing server 102 may also include a transmitting device 224. The transmitting device 224 may be configured to transmit data over one or more networks via one or more network protocols. In some instances, the transmitting device 224 may be configured to transmit data to advertising entities 106, blockchain networks 108, computing devices 110, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to advertising entities 106 that are superimposed or otherwise encoded with mining fee updates, spam report information, transaction identifiers, data requests, etc. The transmitting device 224 may be configured to electronically transmit data signals to nodes in blockchain networks 108, which may be superimposed or otherwise encoded with new blockchain data values, new blocks, requests for blockchain data, etc. The transmitting device 224 may also be configured to electronically transmit data signals that are superimposed or otherwise encoded with advertisement notifications, information regarding spam reports, etc.

The processing server 102 may also include a memory 226. The memory 226 may be configured to store data for use by the processing server 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, blockchain data, hashing algorithms for generating blocks, credentials for validation, usage rule templates, communication data for blockchain nodes, communication data for computing devices 110, formatting standards, etc.

Process for Advertising via Blockchain

Figure 3:
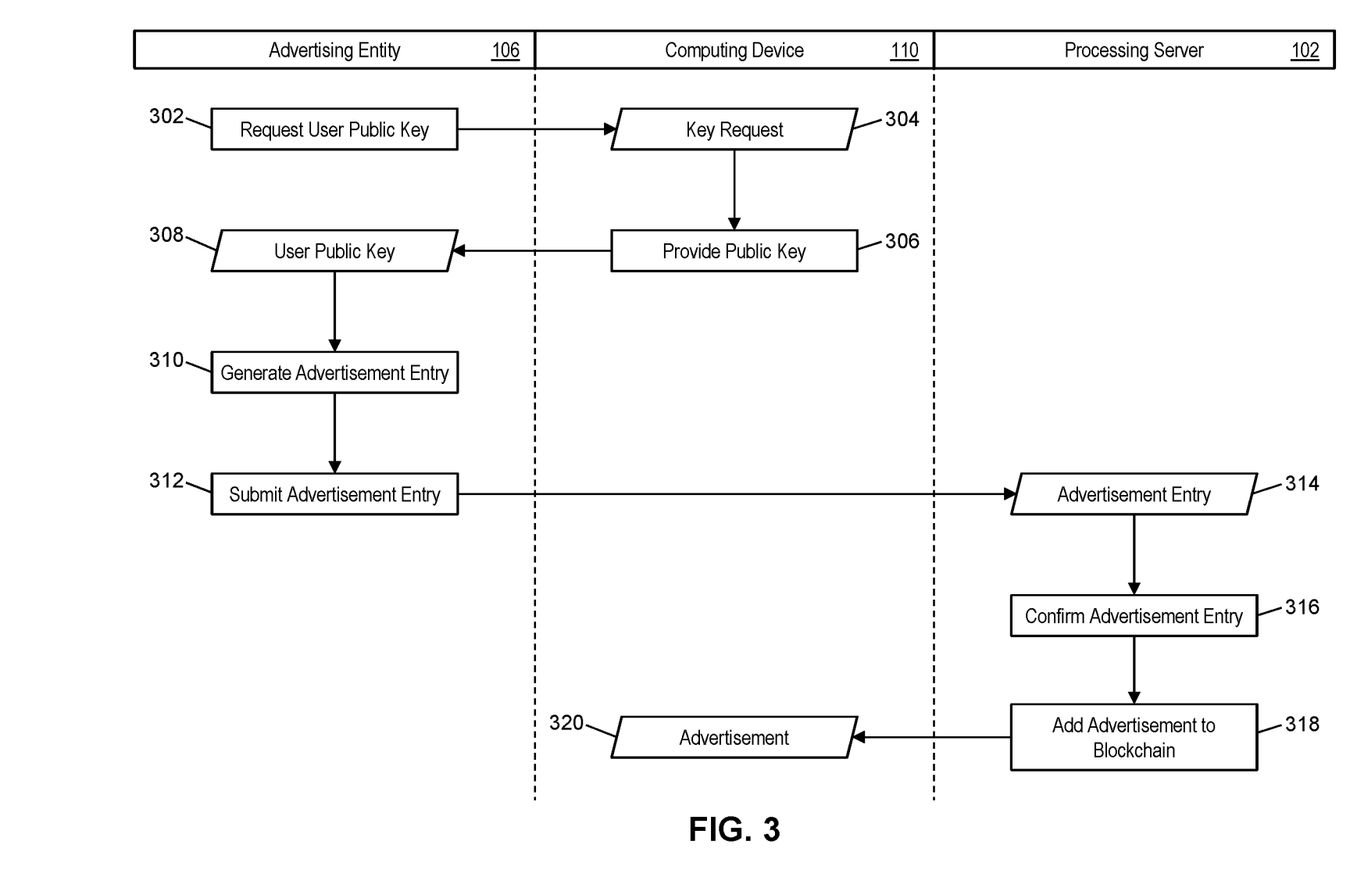
FIG. 3 is a flow diagram illustrating a process for advertising to an individual user on a blockchain by an advertiser in the system of FIG. 1 in accordance with exemplary embodiments.

FIG. 3 illustrates an example process for the delivery of advertisements to users 104 in the system 100 of FIG. 1 through the use of a blockchain.

In step 302, the advertising entity 106 may request a public key from a user 104 via the user's computing device 110 for use in delivering advertisements to the user 104 on the blockchain. In step 304, the computing device 110 of the user 104 may receive the request using a suitable communication network and method. In step 306, the computing device 110 may transmit the public key of its blockchain wallet to the advertising entity 106 using a suitable communication network and method, for receipt thereby, in step 308.

In step 310, the advertising entity 106 may generate a new blockchain data entry that includes an advertisement. The blockchain data entry may include one or more input addresses associated with the advertising entity's blockchain wallet, a recipient address for the user 104 generated using the user's public key, a mining fee, and an advertisement. The advertisement may be included in place of a currency value paired with the user's recipient address, or may be included in a separate data field in the data value where the currency value may be zero. In some embodiments, the blockchain data entry may also include a digital signature generated by the private key of the advertising entity's blockchain wallet. In step 312, the advertising entity 106 may transmit the blockchain data entry with the advertisement to the processing server 102 or other node in the blockchain network 108.

In step 314, the receiving device 202 of the processing server 102 may receive the blockchain data entry with the advertisement. In step 316, the validation module 222 of the processing server 102 may validate the blockchain data entry to confirm that advertisement entry. Validation of the blockchain data entry may include verifying the digital signature using the advertising entity's public key, verifying that the input address(es) are tied to the advertising entity's blockchain wallet through the digital signature and/or public key, verifying that there is suitable currency tied with the input addresses to cover the transfer(s) in the transaction, and verifying that the advertising entity 106 is paying the appropriate mining fee. In some cases, the mining fee may be added to, or adjusted in, the blockchain data value by the processing server 102. In cases where a miner is used, step 316 may include receipt of a nonce or other value and identification of a miner associated therewith. Identification of a miner may include receipt of a recipient address for the miner's blockchain wallet, which may be included in the blockchain data value as an output address tied to the mining fee. Upon validation, then, in step 318, the blockchain data value that includes the advertisement may be included in a new block that is generated, verified, and added to the blockchain through a node (e.g., the processing server 102) in the blockchain network 108. In step 320, the computing device 110 may receive the advertisement via the newly posted blockchain data entry including the advertisement with the computing device's blockchain wallet being a recipient of the transaction.

Process for Adjusting an Advertiser's Spam Index Via Spam Reports

Figure 4:
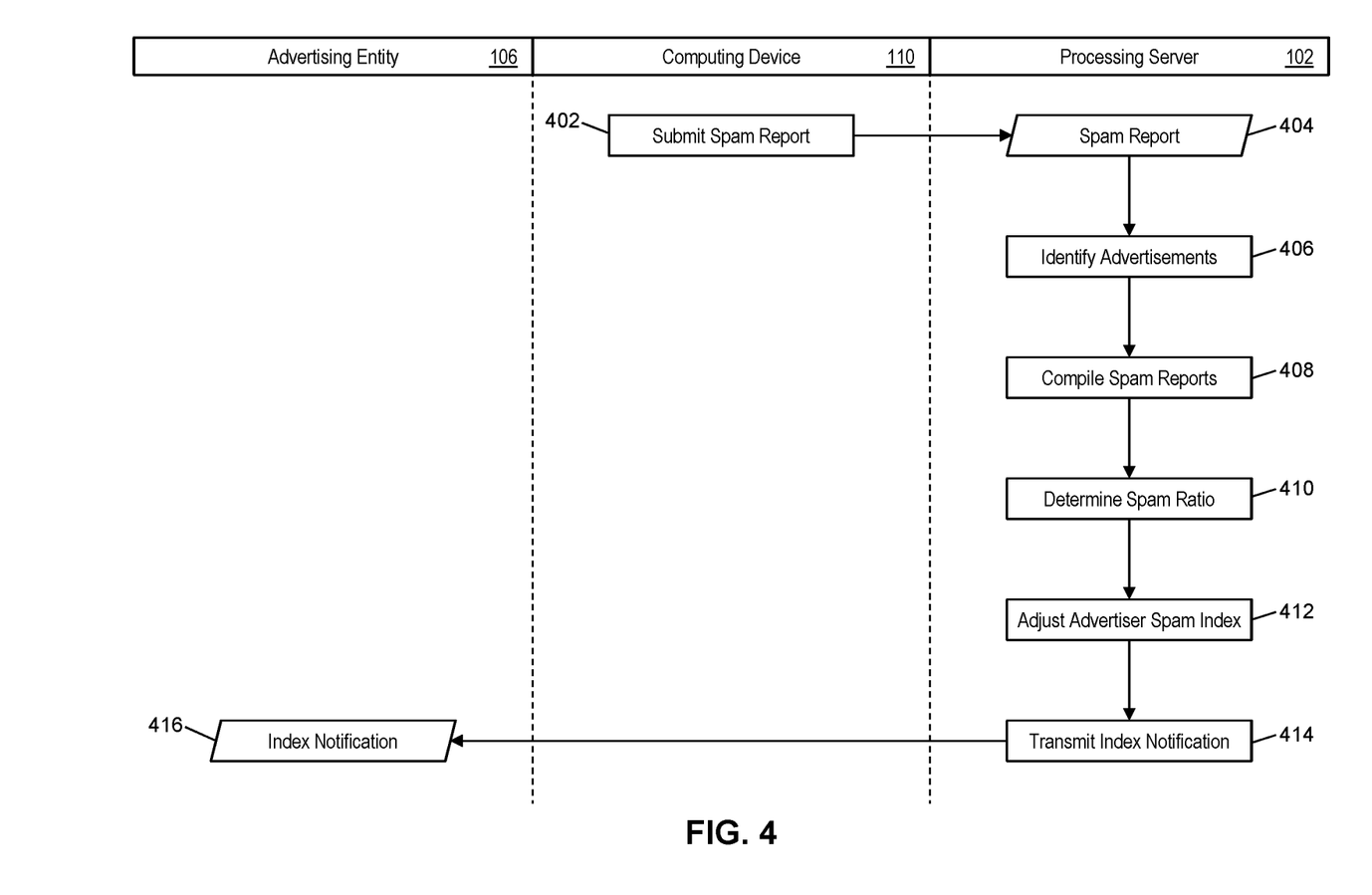
FIG. 4 is a flow diagram illustrating a process for adjusting the spam index for a blockchain advertiser based on user spam reporting in the system of FIG. 1 in accordance with exemplary embodiments.

FIG. 4 illustrates a process for the adjustment of a spam index value associated with an advertising entity 106 that advertises via a blockchain in the system 100 of FIG. 1 based on spam reports submitted by users 104 exposed to blockchain-delivered advertisements.

In step 402, the user 104 may submit a spam report to the processing server 102 via the computing device 110 using any suitable mechanism, such as through an application program, web page, short messaging service message, e-mail, etc. The spam report may include at least a reference to an advertisement, such as a hash of the advertisement or a transaction identifier for the blockchain transaction that was used to deliver the advertisement. In step 404, the receiving device 202 of the processing server 102 may receive the spam report from the user's computing device 110. In step 406, the querying module 218 of the processing server 102 may execute a query on the memory 226 of the processing server 102 to identify instances of the advertisement being delivered in the blockchain by identifying a hash of the advertisement (e.g., as provided by the user 104 or identified in the transaction indicated by the user 104) and identifying occurrences of that hash in any other blockchain data values in the blockchain.

In step 408, the processing server 102 may identify and compile any past spam reports received for the same advertisement, such as may be stored in the memory 226 thereof or an advertiser profile 208 in the advertiser database 206 of the processing server 102 that is associated with the advertising entity 106 that delivered the advertisement. In step 410, the processing server 102 may determine a ratio of spam reports received for the advertisement compared to the total number of times the advertisement was delivered to a user 104. In step 412, the querying module 218 of the processing server 102 may execute a query on the advertiser database 206 to identify the advertiser profile 208 for the advertising entity 106 to adjust the spam index value included therein based on the updated ratio of spam for the advertisement.

In step 414, the transmitting device 224 of the processing server 102 may electronically transmit a notification to the advertising entity 106 that indicates the adjustment to the spam index value for the advertising entity 106. In some embodiments, the notification may also include an updated mining fee to be paid by the advertising entity 106 for future advertisements based on the adjustment to the spam index value. In step 416, the advertising entity 106 may receive the notification from the processing server 102 using a suitable communication network and method.

Exemplary Method for Adjusting a Spam Index Based on User Consensus

Figure 5:
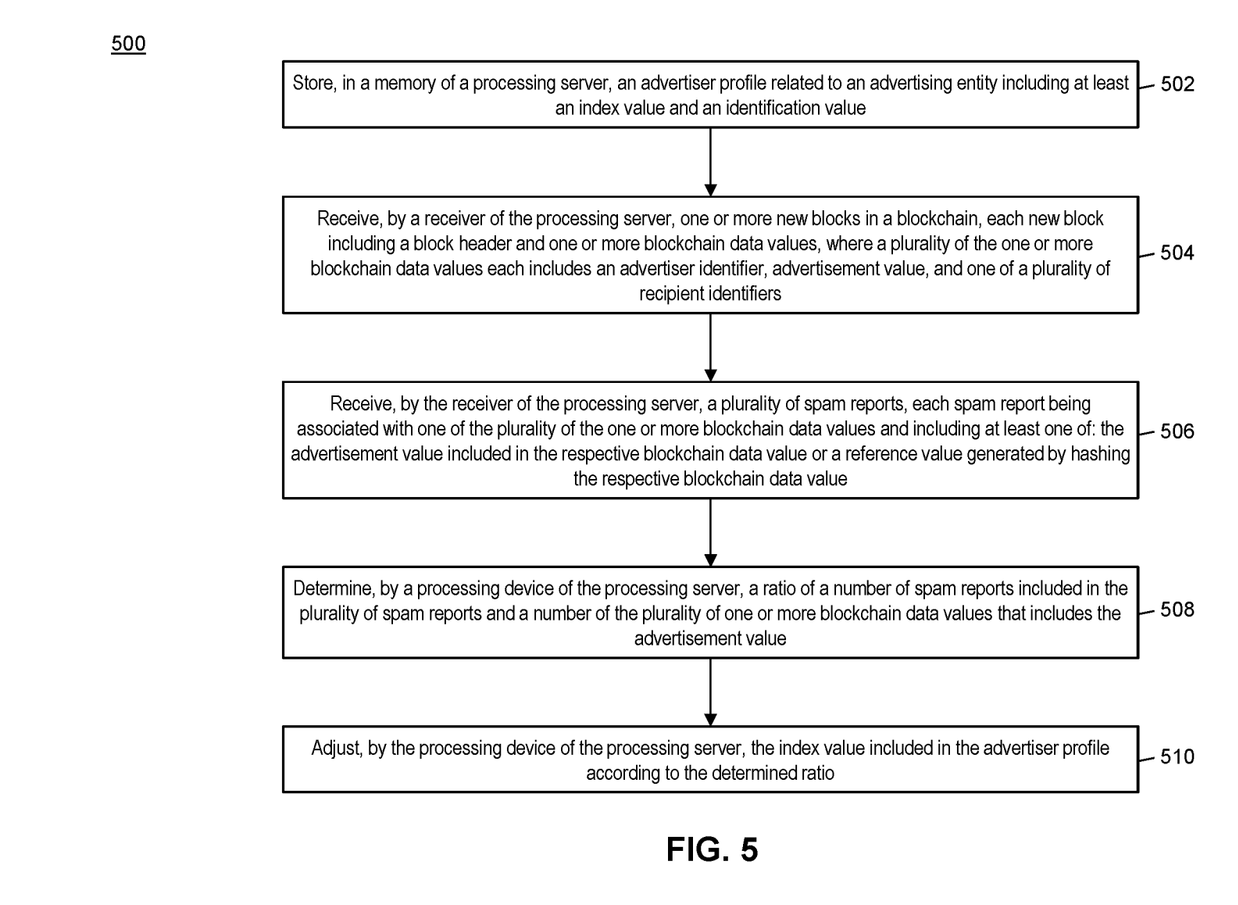
FIG. 5 is a flow chart illustrating an exemplary method for hybrid payment authorization in accordance with exemplary embodiments.

FIG. 5 illustrates a method for the adjustment of a spam index for a blockchain advertiser based on user consensus that affects mining fees charged to the blockchain advertiser when submitting new advertisements to the blockchain.

In step 502, an advertiser profile (e.g., advertiser profile 208) related to an advertising entity (e.g., the advertising entity 106) may be stored in a memory (e.g., advertiser database 206, memory 226, etc.) of a processing server (e.g., the processing server 102), the advertiser profile including at least an index value and an identification value. In step 504, one or more new blocks in a blockchain may be received by a receiver (e.g., the receiving device 202) of the processing server, each new block including a block header and one or more blockchain data values, where a plurality of the one or more blockchain data values each includes an advertiser identifier, advertisement value, and one of a plurality of recipient identifiers. In step 506, a plurality of spam reports may be received by the receiver of the processing server, each spam report being associated with one of the plurality of the one or more blockchain data values and including at least one of: the advertisement value included in the respective blockchain data value or a reference value generated by hashing the respective blockchain data value.

In step 508, a ratio may be determined by a processing device of the processing server of a number of spam reports included in the plurality of spam reports and a number of the plurality of one or more blockchain data values that includes the advertisement value. In step 510, the index value included in the advertiser profile may be adjusted by the processing device of the processing server according to the determined ratio.

In one embodiment, each spam report may further include a digital signature, the digital signature may be generated using a private key of a cryptographic key pair, and the cryptographic key pair may include a public key used to generate the recipient identifier included in the respective blockchain data value. In a further embodiment, the method 500 may further include validating, by the processing device of the processing server, the digital signature included in each spam report of the plurality of spam reports using the public key used to generate the recipient identifier included in the respective data value.

In some embodiments, the identification value may be an advertiser identifier. In one embodiment, the identification value may be a public key of a cryptographic key pair, and the advertiser identifier may be generated using the public key. In some embodiments, the advertiser identifier and plurality of recipient identifiers may be blockchain addresses.

In one embodiment, each of the plurality of the one or more blockchain data values may further include a mining fee amount and a miner identifier. In a further embodiment, the mining fee amount may be based on the index value included in the advertiser profile.

Computer System Architecture

Figure 6:
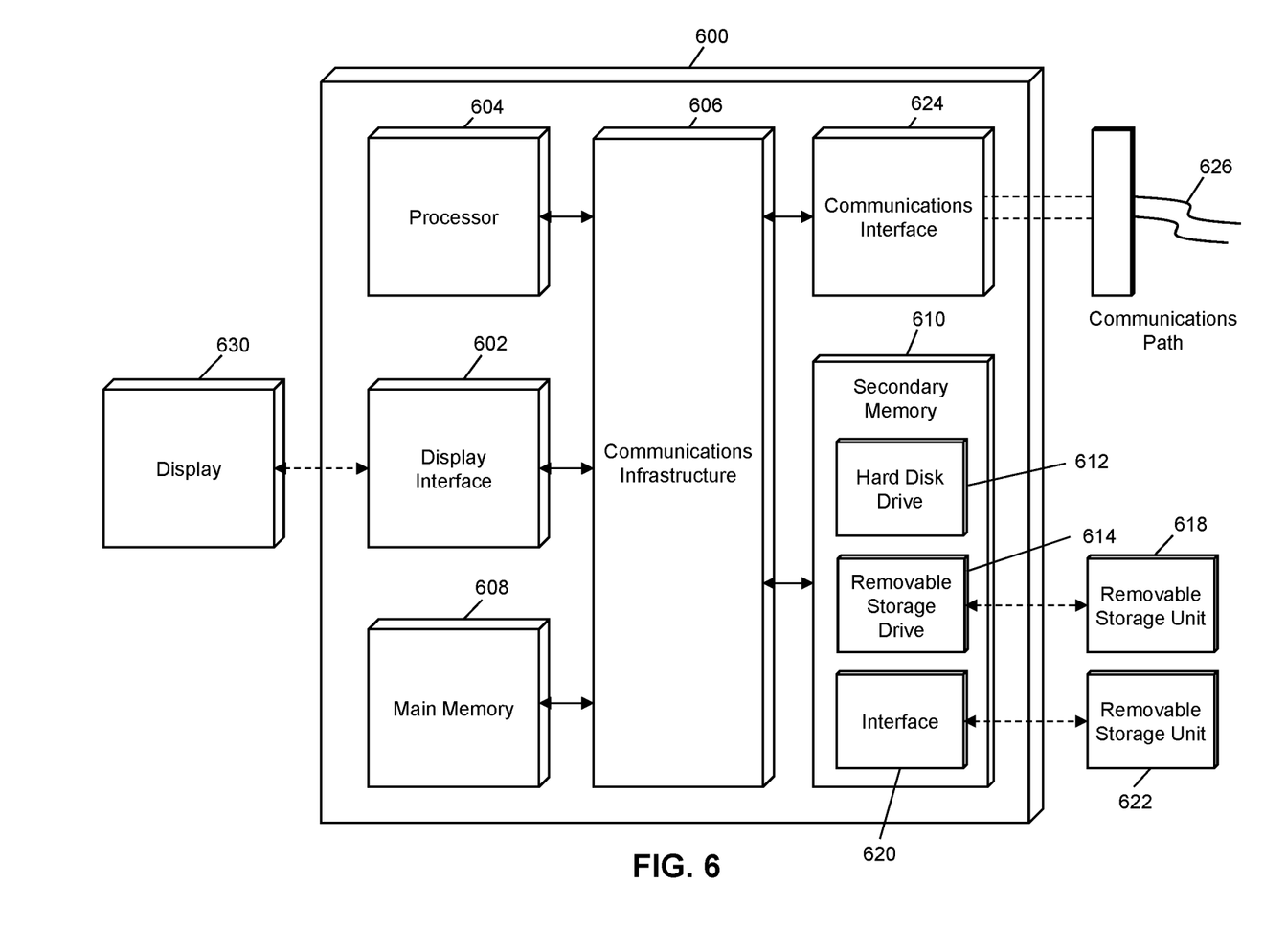
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc.

Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for adjusting a spam index for a blockchain advertiser based on user consensus that affects mining fees charged to the blockchain advertiser. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for adjusting a spam index for a blockchain advertiser based on user consensus that affects mining fees charged to the blockchain advertiser, comprising:
   storing, in a memory of a processing server, an advertiser profile related to an advertising entity including at least an index value and an identification value;
   receiving, by a receiver of the processing server, one or more new blocks in a blockchain, each new block including a block header and one or more blockchain data values, where a plurality of the one or more blockchain data values each includes an advertiser identifier, advertisement value, and one of a plurality of recipient identifiers;
   receiving, by the receiver of the processing server, a plurality of spam reports, each spam report being associated with one of the plurality of the one or more blockchain data values and including a digital signature and at least one of: the advertisement value included in a respective blockchain data value or a reference value generated by hashing the respective blockchain data value, wherein (i) the digital signature is generated using a private key of a cryptographic key pair, and (ii) the cryptographic key pair includes a public key used to generate the recipient identifier included in the respective blockchain data value;
   determining, by a processing device of the processing server, a ratio of a number of spam reports included in the plurality of spam reports and a number of the plurality of one or more blockchain data values that includes the advertisement value; and adjusting, by the processing device of the processing server, the index value included in the advertiser profile according to the determined ratio, wherein the mining fees are based on the index value included in the advertiser profile.

2. The method of claim 1, further comprising:
   validating, by the processing device of the processing server, the digital signature included in each spam report of the plurality of spam reports using the public key used to generate the recipient identifier included in the respective blockchain data value.

3. The method of claim 1, wherein
   the identification value is the advertiser identifier.

4. The method of claim 1, wherein
   the identification value is the public key of the cryptographic key pair, and the advertiser identifier is generated using the public key.

5. The method of claim 1, wherein the advertiser identifier and plurality of recipient identifiers are blockchain addresses.

6. The method of claim 1, wherein each of the plurality of the one or more blockchain data values further includes a mining fee amount and a miner identifier.

7. A system for adjusting a spam index for a blockchain advertiser based on user consensus that affects mining fees charged to the blockchain advertiser, comprising:

a memory of a processing server configured to store an advertiser profile related to an advertising entity including at least an index value and an identification value;

a receiver of the processing server configured to receive one or more new blocks in a blockchain, each new block including a block header and one or more blockchain data values, where a plurality of the one or more blockchain data values each includes an advertiser identifier, advertisement value, and one of a plurality of recipient identifiers, and receive a plurality of spam reports, each spam report being associated with one of the plurality of the one or more blockchain data values and including a digital signature and at least one of: the advertisement value included in a respective blockchain data value or a reference value generated by hashing the respective blockchain data value, wherein (i) the digital signature is generated using a private key of a cryptographic key pair, and (ii) the cryptographic key pair includes a public key used to generate the recipient identifier included in the respective blockchain data value; and a processing device of the processing server configured to determine a ratio of a number of spam reports included in the plurality of spam reports and a number of the plurality of one or more blockchain data values that includes the advertisement value, and adjust the index value included in the advertiser profile according to the determined ratio, wherein the mining fees are based on the index value included in the advertiser profile.

8. The system of claim 7, wherein the processing device of the processing server is further configured to validate the digital signature included in each spam report of the plurality of spam reports using the public key used to generate the recipient identifier included in the respective blockchain data value.

9. The system of claim 7, wherein
the identification value is the advertiser identifier.

10. The system of claim 7, wherein
the identification value is the public key of the cryptographic key pair, and the advertiser identifier is generated using the public key.

11. The system of claim 7, wherein the advertiser identifier and plurality of recipient identifiers are blockchain addresses.

12. The system of claim 7, wherein each of the plurality of the one or more blockchain data values further includes a mining fee amount and a miner identifier.

* * * * *